No. 765,505. PATENTED JULY 19, 1904.
C. J. MOULTON.
POTATO DIGGING MACHINE.
APPLICATION FILED NOV. 21, 1903.
NO MODEL.
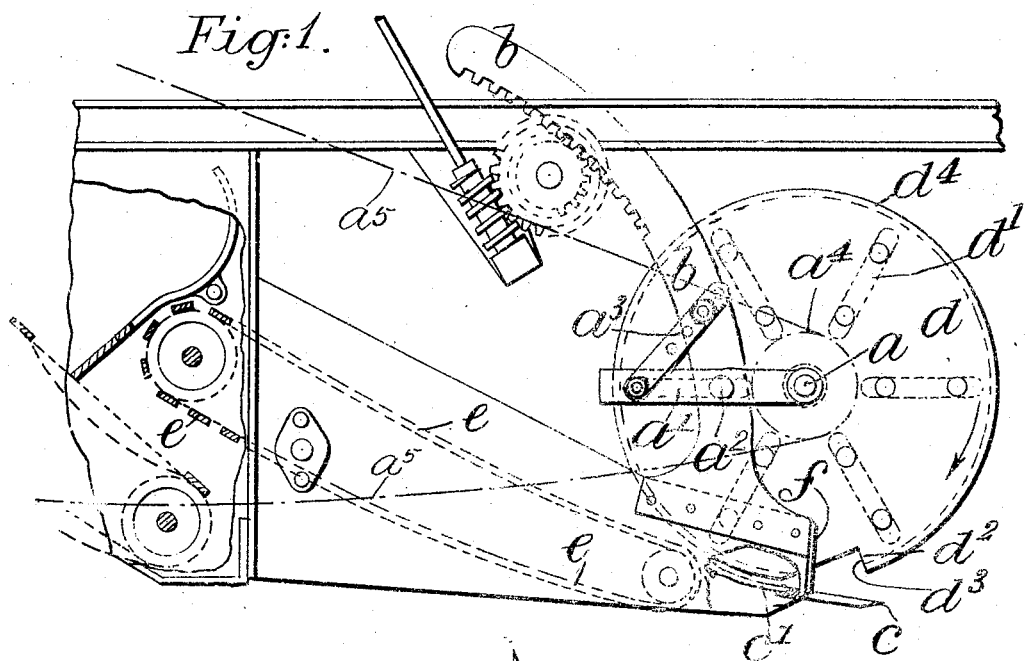
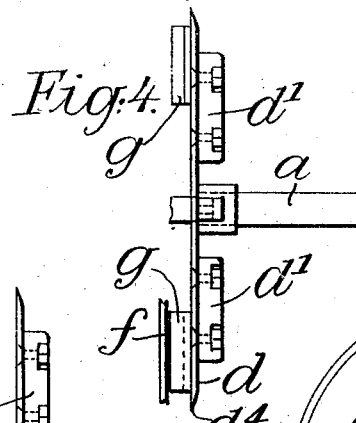
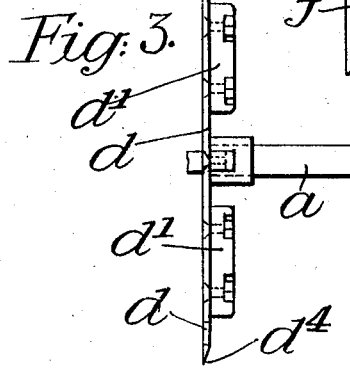
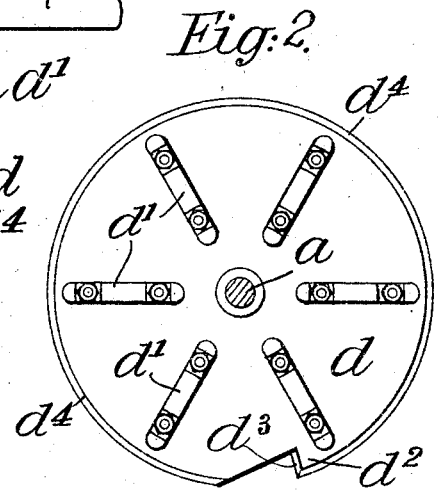

No. 765,505.

Patented July 19, 1904.

UNITED STATES PATENT OFFICE.

CHARLES JOSEPH MOULTON, OF CHATTERIS, ENGLAND.

POTATO-DIGGING MACHINE.

SPECIFICATION forming part of Letters Patent No. 765,505, dated July 19, 1904.

Application filed November 21, 1903. Serial No. 182,090. (No model.)

*To all whom it may concern:*

Be it known that I, CHARLES JOSEPH MOULTON, a subject of the King of Great Britain, residing at Chatteris, in the county of Cambridge, England, have invented certain new and useful Improvements in Potato-Digging Machines, of which the following is a full, clear, and exact description.

The invention relates to machines for digging potatoes of the class shown and described in specifications of United States Letters Patent Nos. 609,289 and 667,890.

The object of the present invention is to construct a machine in which the potatoes are assisted onto the grating or short elevator without injury and in which the weeds or tops are cut, thus allowing the potatoes to pass more easily onto the machine.

The invention is illustrated in the accompanying drawings, in which—

Figure 1 is a side elevation, partly in section, of the front part of the machine. Fig. 2 is a side elevation of a disk hereinafter more fully described. Fig. 3 is a front view of the same, and Fig. 4 shows a front view of a modified form of disk.

In carrying the invention into effect a shaft $a$ is mounted in suitable bearings across the front of the machine. These bearings are preferably carried by levers $a'$, pivoted at $a^2$ to the quadrants $b$, by means of which the height of the share $c$ is regulated. The pivoted levers $a'$ are each provided with a link $a^3$, having a number of holes therein, through one of which a pin or bolt is passed to regulate the height of the shaft $a$ with relation to the share $c$. On each end of the shaft $a$ is fixed a disk $d$, having radial projections $d'$ on their adjacent faces. These disks $d$ are of such a size that when the shaft $a$ is driven by means of a sprocket-wheel $a^4$ thereon and a chain $a^5$ the radial projections $d'$ help to move the earth on each side of a row of potatoes, and consequently the potatoes themselves, onto a short endless elevator $e$. Some machines are provided with a short endless elevator $e$ and a short grating $c'$, as shown in Fig. 1; but these modifications are well known. The disks $d$ are further provided with cutting apparatus to cut the weeds and tops, and thus allow the potatoes to pass more easily onto the machine.

In some cases I form one or more large saw-teeth $d^2$ in the edge of the disk $d$ by cutting away a portion thereof and sharpening one of the edges $d^3$ of the disk $d$ adjacent to the cut-away portion. This saw-tooth $d^2$ acts against a fixed cutter $f$ and severs any tops or weeds that may cross the path of said cutters. A modification of this cutting apparatus is shown in Fig. 4, in which radial cutters $g$ on the exterior of each disk $d$ act against the fixed cutters $f$ on the machine. This class of cutter not only cuts the weeds or tops, but also keeps the space between the disks $d$ and the fixed cutters $f$ or side frames clear of said weeds or tops. The edges $d^4$ of the disks $d$ are somewhat sharp to cut into the soil. The chain $a^5$ is driven from a chain-wheel on the main axle of the machine or on any other rotating shaft. (Not shown.)

Having fully described my invention, what I claim, and desire to secure by Letters Patent, is—

In a potato-digging machine, the combination with the share, of a driven disk on each side of the share, projections on the adjacent faces of said disks and cutters carried by said disks acting against fixed cutters on the machine substantially as herein shown and described.

In witness whereof I have hereunto set my hand in presence of two witnesses.

CHARLES JOSEPH MOULTON.

Witnesses:
 B. J. B. MILLS,
 WM. GIRLING.